(12) United States Patent
Ezrielev et al.

(10) Patent No.: US 12,423,280 B2
(45) Date of Patent: Sep. 23, 2025

(54) SYSTEM AND METHOD FOR IDENTIFYING POISONED DATA DURING DATA CURATION

(71) Applicant: Dell Products L.P., Round Rock, TX (US)

(72) Inventors: Ofir Ezrielev, Beer Sheva (IL); Hanna Yehuda, Acton, MA (US); Kristen Jeanne Walsh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 232 days.

(21) Appl. No.: 18/343,945

(22) Filed: Jun. 29, 2023

(65) Prior Publication Data

US 2025/0005002 A1    Jan. 2, 2025

(51) Int. Cl.
    *G06F 16/215*    (2019.01)
(52) U.S. Cl.
    CPC .................. *G06F 16/215* (2019.01)
(58) Field of Classification Search
    CPC ................................... G06F 16/215
    See application file for complete search history.

(56) References Cited

U.S. PATENT DOCUMENTS

| | | |
|---|---|---|
| 7,315,805 B2 | 1/2008 | Slater |
| 10,168,691 B2 | 1/2019 | Zornio et al. |
| 10,936,479 B2 | 3/2021 | Maag et al. |
| 11,101,037 B2 | 8/2021 | Allen |
| 11,221,270 B2 | 1/2022 | Evans |
| 11,341,605 B1 | 5/2022 | Singh |
| 11,853,853 B1 | 12/2023 | Beauchesne et al. |
| 12,008,046 B1 | 6/2024 | Curtis et al. |
| 12,242,892 B1 | 3/2025 | Burnett |
| 2004/0064750 A1 | 4/2004 | Conway |

(Continued)

OTHER PUBLICATIONS

Wang, Haozhe, et al., "A graph neural network-based digital twin for network slicing management," IEEE Transactions on Industrial Informatics 18.2 (2020): 1367-1376 (11 Pages).

(Continued)

*Primary Examiner* — Maher N Algibhah
(74) *Attorney, Agent, or Firm* — WOMBLE BOND DICKINSON (US) LLP

(57) ABSTRACT

Methods and systems for curating data from data sources are disclosed. Data may be curated from various data sources before being stored in a repository and/or supplied to downstream consumers. The downstream consumers may rely on the trustworthiness of the curated data to provide desired computer-implemented services. During the data curation process, collected data may undergo quality control processes such as anomaly detection that may identify anomalies in the data. The identified anomalies may indicate the presence of poisoned data that, if provided to downstream consumers, may negatively impact the computer-implemented services facilitated by the downstream consumers. When poisoned data is detected among the data, portions of the data affected by the poisoned data (e.g., the poisoned portions) may be identified using an optimization process. The poisoned data may be used to identify and initiate performance of an action set that may reduce the impact of the poisoned data.

20 Claims, 4 Drawing Sheets

(56) References Cited

U.S. PATENT DOCUMENTS

| | | |
|---|---|---|
| 2006/0009881 A1 | 1/2006 | Ferber et al. |
| 2014/0037161 A1 | 2/2014 | Rucker |
| 2014/0136184 A1 | 5/2014 | Hatsek |
| 2016/0098037 A1 | 4/2016 | Zornio |
| 2018/0081871 A1 | 3/2018 | Williams |
| 2019/0034430 A1 | 1/2019 | Das |
| 2019/0236204 A1 | 8/2019 | Canim |
| 2019/0251479 A1* | 8/2019 | Anderson ........... H04L 63/1466 |
| 2019/0370263 A1 | 12/2019 | Nucci |
| 2020/0166558 A1 | 5/2020 | Weis |
| 2020/0167224 A1 | 5/2020 | Abali |
| 2020/0202478 A1 | 6/2020 | Thumpudi et al. |
| 2020/0293684 A1 | 9/2020 | Harris |
| 2021/0027771 A1 | 1/2021 | Hall |
| 2021/0116505 A1 | 4/2021 | Shu |
| 2021/0374143 A1 | 12/2021 | Neill |
| 2021/0377286 A1* | 12/2021 | Shukla ................ G06F 21/577 |
| 2021/0406110 A1 | 12/2021 | Vaid et al. |
| 2022/0092234 A1 | 3/2022 | Karri |
| 2022/0301027 A1 | 9/2022 | Basta |
| 2022/0310276 A1 | 9/2022 | Wilkinson |
| 2022/0374399 A1 | 11/2022 | Kementsietsidis |
| 2023/0014438 A1 | 1/2023 | Jones |
| 2023/0040834 A1 | 2/2023 | Haile |
| 2023/0126260 A1 | 4/2023 | Elsakhawy et al. |
| 2023/0153095 A1 | 5/2023 | Rahill-Marier |
| 2023/0196096 A1 | 6/2023 | Milne |
| 2023/0213930 A1 | 7/2023 | Rakshit |
| 2023/0315078 A1 | 10/2023 | Sepulveda et al. |
| 2023/0342281 A1 | 10/2023 | Haile |
| 2023/0418280 A1 | 12/2023 | Emery |
| 2024/0119364 A1 | 4/2024 | Jain |
| 2024/0126888 A1* | 4/2024 | Kalou .................. G06F 21/577 |
| 2024/0235952 A9 | 7/2024 | Hicks |
| 2024/0281419 A1 | 8/2024 | Alfaras |
| 2024/0281522 A1 | 8/2024 | Kuo |
| 2024/0330136 A1 | 10/2024 | Furlong |
| 2024/0412104 A1 | 12/2024 | Zhang |

OTHER PUBLICATIONS

Almasan, Paul, et al., "Digital Twin Network: Opportunities and challenges," arXiv preprint arXiv:2201.01144 (2022) (7 Pages).

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0' Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud, Jun. 10, 2021, Web Page <https://cloud.google.com/blog/topics/financial-services/detect-anomalies-in-real-time-forex-data-with-ml> accessed on Feb. 14, 2023 (16 Pages).

Wang, Haozhe, et al., "A graph neural network-based digital twin for network slicing management," IEEE Transactions on Industrial Informatics 18.2 (2020): 1367-1376 (10 Pages).

* cited by examiner

SYSTEM AND METHOD FOR IDENTIFYING POISONED DATA DURING DATA CURATION

FIELD

Embodiments disclosed herein relate generally to data management. More particularly, embodiments disclosed herein relate to systems and methods to identify poisoned data that may be introduced during data curation.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
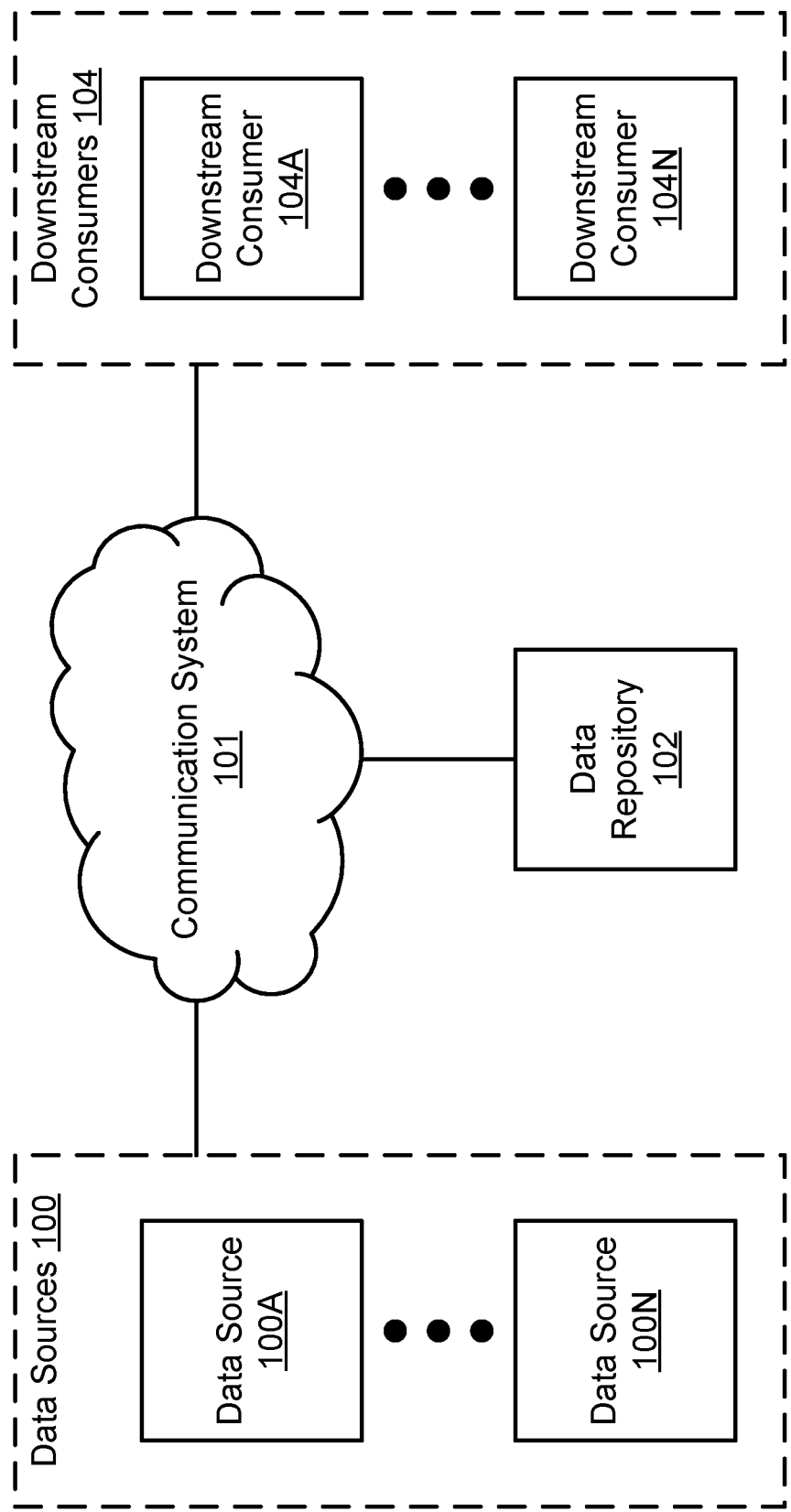
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for curating data from data sources prior to addition to (e.g., being stored in) a data repository. Data curation may refer to a process of collecting, organizing, preserving, and/or maintaining data for use by consumers. For example, downstream consumers of curated data may rely on raw and/or processed (e.g., transformed, organized, etc.) data being made accessible in order to provide computer-implemented services.

Data curation may include obtaining data from various data sources and/or storing the data in one or more data repositories. The data repository may utilize one or more data processing systems to manage the data curation process, which may include quality control measures. For example, quality control measures may be implemented in order to detect anomalous data collected from the data sources, such as poisoned data provided by malicious parties. To detect and/or measure the anomalousness of the collected data, statistical methods may be employed. When an anomaly is detected (e.g., by comparing a statistical characterization of a data point to a threshold), the data repository and/or the downstream consumers may be alerted of the presence of poisoned data.

However, small-scale anomaly detection (e.g., performed on individual or small groups of data points of raw data) may not detect certain types of anomalous data, such as large amounts of statistically consistent anomalous data and/or poisoned data designed to otherwise remain undetected during anomaly detection processes. Therefore, to detect these types of malicious attacks, anomaly detection may be performed on a larger scale using aggregate data.

In addition, when the presence of anomalous data is detected in large amounts of data, only the poisoned portions may pose a threat to the downstream consumers. Therefore, the poisoned portions (e.g., the smallest portions of data only including poisoned data) may be identified using global optimization methods. Further, the identified poisoned data may be used to generate actions (e.g., action sets) that may be performed in order to remediate the impact of the poisoned data on the computer-implemented services provided by the downstream consumers.

By doing so, embodiments disclosed herein may provide a system for identifying poisoned data collected from various data sources during data curation. The detection and identification of anomalous data (e.g., poisoned data introduced by malicious parties) may be improved by performing anomaly detection at an aggregate level and identifying the portions of anomalous data using global optimization algorithms. The collected data may then be managed by performing remedial actions that may increase the likelihood of providing the downstream consumers with uninterrupted and/or reliable access to unpoisoned (e.g., high quality) data.

By doing so, an improved computing device and/or distributed system may be obtained. The improved device and/or system may be more likely to be able to provide the desired computer-implemented services.

In an embodiment, a method for curating data from data sources prior to addition to a data repository is provided. The method may include making an identification that the data includes poisoned data. Based on the identification, the method may also include: performing an optimization process using the data to identify the poisoned data, wherein during the optimization process, test proposals are generated that indicate different delineations between potentially poisoned data and potentially unpoisoned data, and the test proposals are evaluated based on an anomalousness of different portions of the data defined by the delineations; and, initiating performance of an action set, based on the identified poisoned data, to manage an impact of the identified poisoned data.

Making the identification may include performing a first anomaly detection process using a first statistical characterization of the data and an anomaly threshold, the data being aggregate data and the first statistical characterization being based on a first aggregate data summary for the aggregate data. The first statistical characterization may indicate a degree of anomalousness of the aggregate data.

Each test proposal of the test proposals may indicate a first portion of the data that is potentially poisoned, a second portion of the data that is potentially unpoisoned, and the first portion and second portion are identified using a corresponding delineation of the delineations.

Performing the optimization process may include iteratively generating sets of the test proposals, each subsequent set of the sets being generated based on a selection of the test proposals from a previous set, the selection being based on a rank ordering of the test proposals of the previous set. The rank ordering may be based on a fitness value for each test proposal of the previous set.

The rank ordering may be obtained by, for each test proposal of the test proposals: obtaining a second statistical characterization of the second portion and a size of the first portion, the second statistical characterization being based on a second aggregate data summary of the first portion, and the second statistical characterization indicating a degree of anomalousness of the second portion; obtaining the fitness value based on the second statistical characterization, the size, and the anomaly threshold; and, obtaining the rank for the test proposal based on the fitness value, the rank being usable to order the test proposals.

Identifying the poisoned data may include selecting a final test proposal of the test proposals based on the ranks of the test proposals, the final test proposal being an optimized solution of the optimization process.

An objective function, used to obtain the fitness value, may penalize each test proposal proportionally to a ratio of the size of the first portion to the size of the second portion.

The optimization process may be implemented using a genetic algorithm.

The action set may include screening the poisoned data from use by a downstream consumer.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services utilizing data obtained from any number of data sources and stored in a data repository prior to performing the computer-implemented services. The computer-implemented services may include any type and quantity of computer-implemented services. For example, the computer-implemented services may include monitoring services (e.g., of locations), communication services, and/or any other type of computer-implemented services.

The computer-implemented services may be performed, in part, by using artificial intelligence (AI) models. For example, data obtained from data sources may be used as training data (e.g., used to train the AI models to perform the computer-implemented services), and/or as ingest data (e.g., used as input to trained AI models in order to perform the computer-implemented services).

To facilitate the computer-implemented services, the system may include data sources 100. Data sources 100 may include any number of data sources. For example, data sources 100 may include one data source (e.g., data source 100A) or multiple data sources (e.g., 100A-100N). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of temperature sensors positioned in an environment to collect temperature measurements according to a data collection schedule. Data sources 100 may be associated with a data pipeline and, therefore, may collect the temperature measurements, may perform processes to sort, organize, format, and/or otherwise prepare the data for future processing in the data pipeline, and/or may provide the data to other data processing systems in the data pipeline (e.g., via one or more application programming interfaces (APIs)).

Data sources 100 may provide data to data repository 102. Data repository 102 may include any number of data processing systems including hardware and/or software components configured to facilitate performance of the computer-implemented services. Data repository 102 may include a database (e.g., a data lake, a data warehouse, etc.) to store data obtained from data sources 100 (and/or other entities throughout a distributed environment).

Data repository 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services. Continuing with the above example, data repository 102 may obtain the temperature measurements from data sources 100 as part of the data pipeline. Data repository 102 may obtain the temperature measurements via a request through an API and/or via other methods.

Prior to data being stored by data repository 102, data may be subjected to quality control measures. The quality control measures may include the monitoring and/or analysis of the data. For example, as data is collected, anomaly detection processes may be performed in order to identify unexpected changes in the collected data. Anomaly detection may be used to identify incomplete, irrelevant, and/or inaccurate data among the collected data. Anomaly detection algorithms may employ statistical analysis and/or machine learning to identify data that deviates from a norm (e.g., what is historically expected). For more details regarding anomaly detection, refer to the discussion of FIG. 2.

Data curation (e.g., anomaly detection) may be performed by a data processing system of data repository 102 and/or a data processing system independent of data repository 102 (e.g., a third party).

Continuing with the above example, data repository 102 may curate the temperature data (e.g., identify errors/omissions and correct them, etc.) and may store the curated temperature data temporarily and/or permanently in a data lake or other storage architecture. Following curating the temperature data, data repository 102 may provide the temperature measurements to other entities for use in performing the computer-implemented services.

Data stored in data repository 102 may be provided to downstream consumers 104. Downstream consumers 104 may utilize the data from data sources 100 and/or data repository 102 to provide all, or a portion of, the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

However, if the data utilized by downstream consumers 104 is untrustworthy (e.g., includes poisoned data), the computer-implemented services facilitated by downstream consumers 104 may be negatively affected. For example, data obtained from data sources 100 may include poisoned portions of data that may be untrustworthy. The poisoned portions may be provided by malicious parties with the intent to negatively impact (and/or influence the outcome of the computer-implemented services provided by) the downstream consumers. Thus, the detection of anomalous data (e.g., poisoned data) may be implemented to ensure the provision of desired computer-implemented services.

Continuing with the above example, downstream consumers 104 may utilize the temperature data from data repository 102 as input data for climate models. Specifically, downstream consumers 104 may utilize the temperature data to simulate future temperature conditions in various environments over time (e.g., to predict weather patterns, climate change, etc.). However, the introduction of poisoned temperature data (e.g., incorrect temperature data) may skew the climate models, and/or may negatively impact the simulations, which may prevent downstream consumers 104 from providing the desired computer-implemented services.

In general, embodiments disclosed herein may provide methods, systems, and/or devices for curating data from data sources. The data curation methods may employ processes that may (i) perform data aggregation of data collected from the data sources (e.g., to obtain aggregate data summaries), (ii) detect the presence of anomalous data (e.g., poisoned data) in the collected data sources (e.g., using statistical analysis of the aggregate data summaries), (iii) identify data portions of the anomalous data, and/or (iv) identify remedial actions that may be performed to manage the impact of the anomalous data portions (e.g., impacts on downstream consumers). By doing so, the system may be more likely to be able to provide trustworthy data to downstream consumers that may facilitate performance of the desired computer-implemented services.

Figure 2:
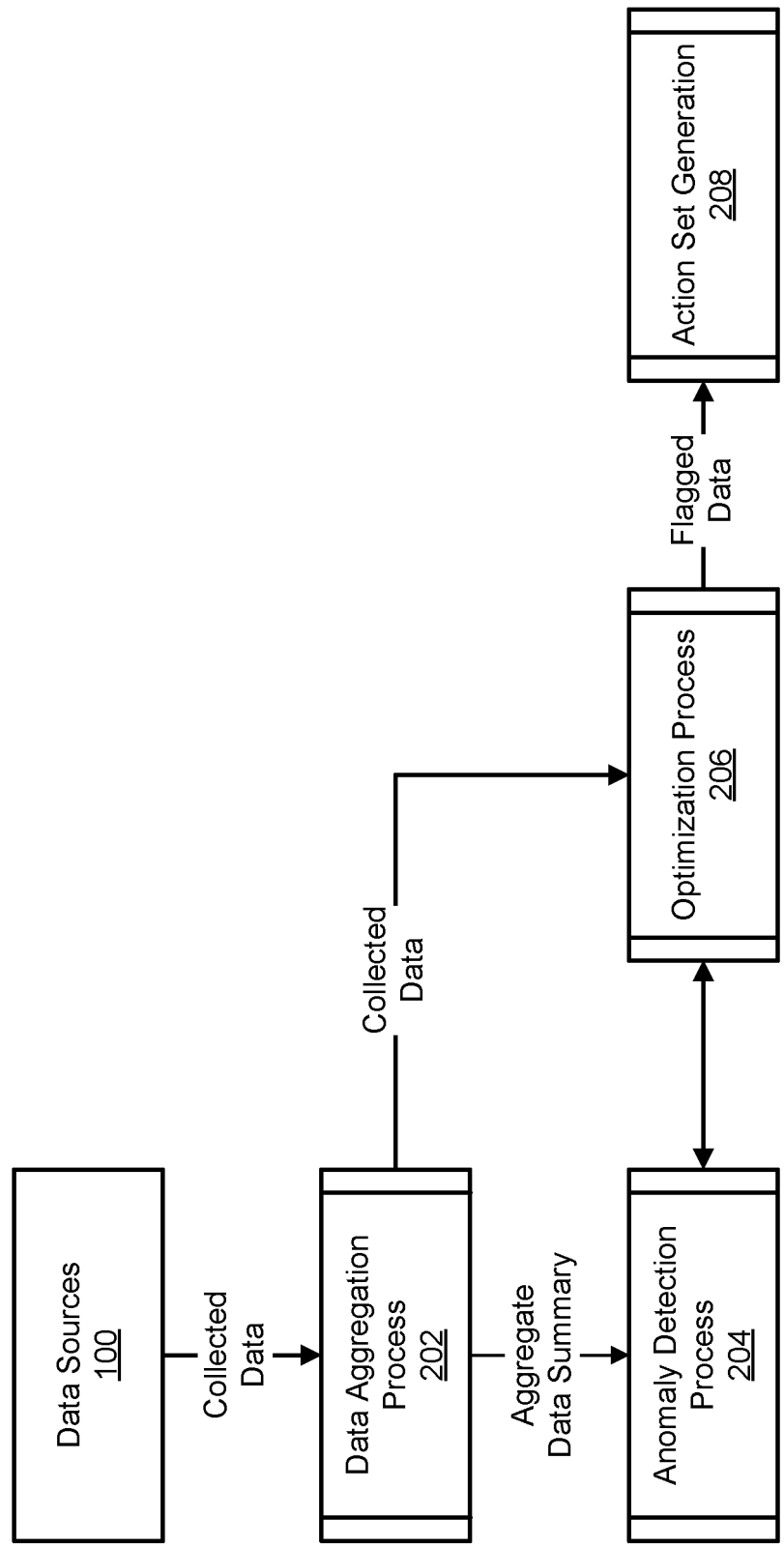
FIG. 2 shows a data flow diagram illustrating a process of identifying poisoned data in accordance with an embodiment.
Figure 3:
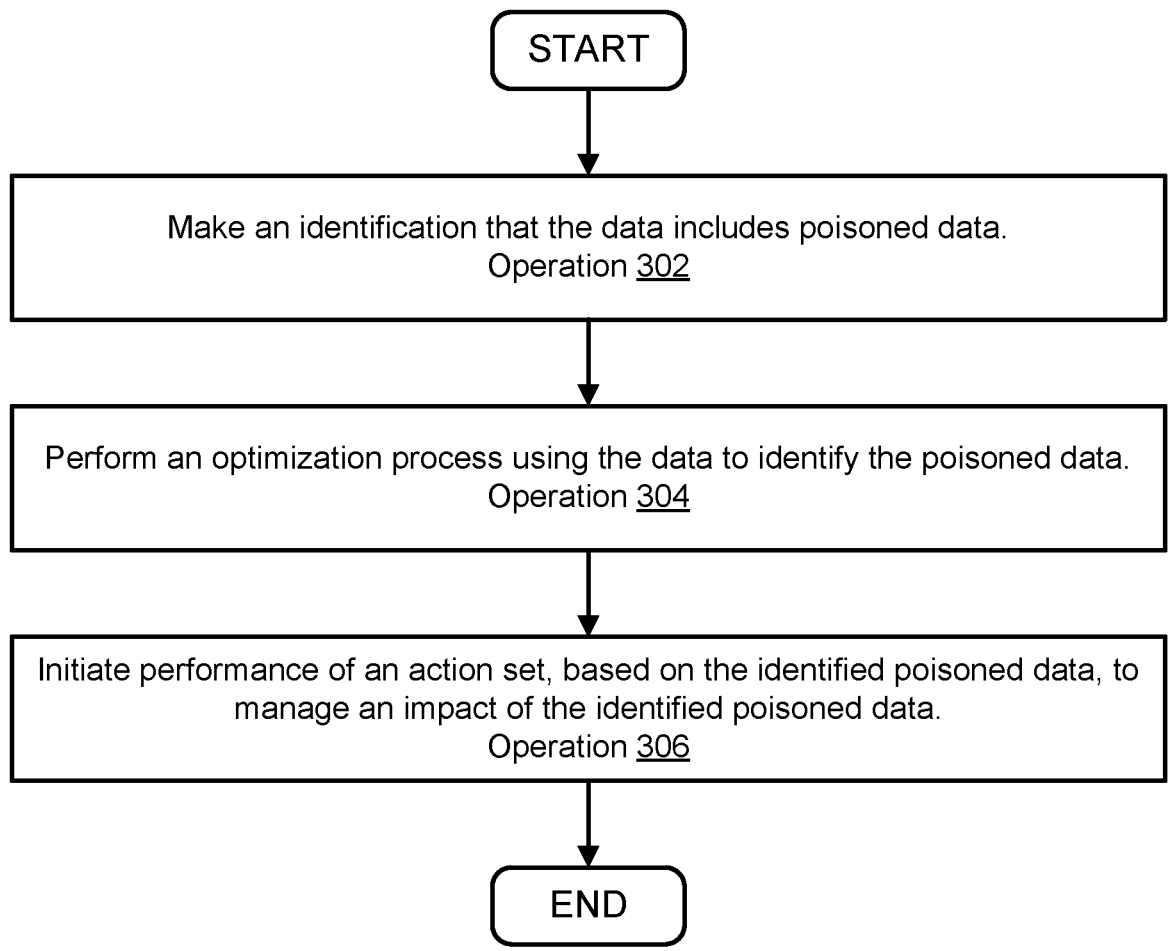
FIG. 3 shows a flow diagram illustrating a method for curating data in accordance with an embodiment.

When performing its functionality, data sources 100, data repository 102, and/or downstream consumers 104 may perform all, or a portion, of the methods and/or actions shown in FIGS. 2-3.

Data sources 100, data repository 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, one or more of data sources 100, data repository 102, and/or downstream consumers 104 are implemented using an internet of things (IoT) device, which may include a computing device. The IoT device may operate in accordance with a communication model and/or management model known to data sources 100, data repository 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

While the above example relates to climate models, it will be appreciated that data may be collected and/or stored in data repositories in order to provide other types of computer-implemented services without departing from embodiments disclosed herein.

The system described in FIG. 1 may be used to identify anomalies (e.g., statistical anomalies) during data curation. The anomalies may indicate the presence of poisoned data, which may be identified in order to mitigate its effects. The following operations described in FIG. 2 may be performed by the system in FIG. 1 when providing this functionality.

Turning to FIG. 2, a data flow diagram is shown in accordance with an embodiment. The data flow diagram may illustrate a process of identifying poisoned data in a system similar to that of FIG. 1. The poisoned data may be identified using various processes, including data aggregation processes, anomaly detection processes, and/or optimization processes.

As discussed with respect to FIG. 1, data sources 100 may provide data (e.g., curated data) to downstream consumers 104 in order to facilitate the provision of computer-implemented services. The data curation process may collect, organize, and/or transform raw data into data usable by downstream consumers Raw data obtained from data sources 100 (e.g., collected data) may undergo data aggregation process 202. Data aggregation process 202 may be performed at a large scale (e.g., using large amounts of data), and may include gathering portions of the collected data and/or compiling the collected data. For example, data points of the raw data may be aggregated with respect to time (e.g., within a time interval), and/or may be summarized at different levels of granularity (e.g., the summary may include statistics describing individual data points and/or compiled statistics describing groups of data points). The summary may include a report of statistics such as minimum, maximum, mean, standard deviation, mode, sum, count, etc., the values of which may be used to gain insight into data anomalousness.

As used herein, when data is referred to being anomalous, the anomalousness may be in reference to the statistics of the data (e.g., the statistics of the aggregate data) as being anomalous with respect to the statistics of other data (e.g., other aggregate data). As such, anomalous data may be untrustworthy (e.g., poisoned, low quality, incorrect, etc.).

Continuing with the temperature data example, the temperature measurements collected from temperature sensors may be aggregated by geographical region over a number of years. An aggregate data summary may include compiled statistics (e.g., daily minimum, daily maximum, hourly average, etc.) that describe the temperature measurements for each day of each year for the geographical region. The data (e.g., compiled statistics) presented in the aggregate data summary may be used, for example, to identify whether the collected temperature data (and/or newly collected temperature data) includes anomalous (e.g., untrustworthy) temperature measurements.

Any number of summaries (e.g., aggregate data summaries) may be generated during data aggregation process 202. Data aggregation process 202 may store the aggregate data summaries in a database where the summaries may be collated and/or later accessed for further statistical analysis (e.g., for the purposes of anomaly detection).

Anomaly detection process 204 may obtain an aggregate data summary generated by data aggregation process 202. Anomaly detection process 204 may be performed using statistical analysis, for example, by generating statistical characterizations (e.g., statistical measurements) of the aggregate data (e.g., using information from an aggregate data summary of the aggregate data). The statistical characterization may indicate the degree of anomalousness of the aggregate data. To determine whether the aggregate data described by the statistical characterization includes anomalous data, the statistical characterization may be compared to an anomaly threshold. For example, when a statistical characterization (e.g., z-score, ratio, and/or other forms of statistical measurement) of aggregate data exceeds the anomaly threshold, the data (e.g., collected data) represented by the aggregate data may be treated as including poisoned data.

Anomaly detection process 204 may also be performed using an AI model trained to perform anomaly detection on aggregate data. For example, the AI model may be trained using historical aggregate data that has been labeled (e.g., by a user) based on historical outcomes of data poisoning. The trained AI model may then generate predictions and/or likelihoods for whether newly generated aggregate data includes anomalous data (e.g., whether newly collected data represented by the newly generated aggregate data includes poisoned data).

When anomalous data is detected during anomaly detection process 204, information regarding the anomalous data may be provided to and/or accessed by optimization process 206, which may be a global optimization process. Information regarding the anomaly may include (i) a notification (e.g., that an anomaly was detected), (ii) data pointers (e.g., that point to the addresses of the collected data summarized in the aggregate data summary), (iii) an anomaly threshold value, (iv) a statistical characterization (e.g., the type and value), and/or (v) other information (e.g., data source identifiers).

Optimization process 206 may use the information regarding the anomaly to identify a poisoned portion of data associated with the anomaly detected during anomaly detection process 204. Optimization process 206 may minimize (or maximize) an objective function, and the objective function may be used to constrain and/or quantify possible solutions of optimization process 206. Optimization process 206 may be implemented using an optimization algorithm such as a genetic algorithm and/or other global optimization algorithms that may be used to solve optimization problems for complex datasets and/or multivariate objective functions.

To identify the poisoned portion of data, optimization process 206 may obtain information from anomaly detection process 204 (e.g., regarding the detected anomaly associated with the aggregate data summary) and/or a dataset from data aggregation process 202 (e.g., the collected data associated with the aggregate data summary). The optimization algorithm may generate (e.g., iteratively) sets of test proposals, where each test proposal indicates a different delineation of the dataset. The delineations may define two portions of the dataset: a first portion being potentially poisoned, and a second portion being potentially unpoisoned. The first iteration of test proposals may be randomly generated (e.g., based on a random sampling of the data). Subsequent iterations of test proposals may be generated based on a selection of test proposals from the previous iteration, and iterations may continue until a satisfactory solution (e.g., the optimized solution) is determined, and/or a maximum number of iterations is reached.

Each test proposal of a given iteration may be evaluated (e.g., assigned a fitness value) based on the characteristics of one or each of the portions. The characteristics may include a statistical characterization of the potentially unpoisoned portion (e.g., that describes the anomalousness of the potentially unpoisoned portion), and/or the size of the poisoned portion. For example, the statistical characterization of the potentially unpoisoned portion may be compared to an anomaly threshold (e.g., the same anomaly threshold used as part of anomaly detection process 204). If the statistical characterization is inferior to the anomaly threshold, the test proposal may be further evaluated using an objective function.

The objective function may be a loss function that represents the anomalousness of the potentially unpoisoned portion and/or the size of the potentially poisoned portion. The fitness value may be based on the residual of the loss function (e.g., test proposals that are assigned smaller fitness values may better satisfy the loss function than those being assigned larger fitness values). Each test proposal of a given iteration may be ranked by fitness value (e.g., in ascending order). One or more ranked test proposals may be selected for use in the subsequent iteration (e.g., to generate another set of test proposals). The selected test proposal(s) may be one or more of the highest-ranked test proposals (e.g., the test proposals that provide the most satisfactory solution to the global optimization problem for the given iteration).

The selected test proposals may undergo modifications before being used to generate the subsequent iteration of test proposals. For example, some elements of a selected test proposals may be adjusted (e.g., mutation), and/or other selected test proposals may be combined (e.g., crossover). However, in some cases, one or more selected test proposals may be used to generate the subsequent iteration without change (e.g., elitism).

Once a maximum number of iterations and/or a predetermined fitness value threshold is reached, optimization process 206 may identify a final test proposal. The final test proposal may indicate a delineation between the least anomalous potentially unpoisoned portion and the smallest potentially poisoned portion. In other words, the final test proposal may determine the poisoned portion of the data.

As discussed with respect to FIG. 1, the impact of supplying poisoned data to downstream consumers may adversely affect the intended computer-implemented services. Therefore, the poisoned portion of data may be flagged as poisoned data. The flagged data may include metadata (e.g., data pointer information, data source identifiers, and/or statistical characterizations that may indicate the degree of anomalousness).

To manage the impact of the identified poisoned data, action set generation 208 may generate an action set based on the flagged data from optimization process 206. For example, the action set may include (i) separating the poisoned portion of the data from the remainder of the data (e.g., the unpoisoned portion of the data), (ii) retaining (e.g., curating) the unpoisoned portion and/or making the unpoisoned portion available to downstream consumers, (iii) preventing storage of the poisoned portion of data in the data repository, (iv) screening the portion of poisoned data from use by a downstream consumer, (v) performing further analysis of the flagged data (e.g., based on historically flagged data). Further analysis of the flagged data may include identifying poor quality and/or malicious data sources, and/or assigning a level of risk to the poisoned portion.

Thus, as illustrated in FIG. 2, the system of FIG. 1 may perform data aggregation, anomaly detection, and/or may identify poisoned data (e.g., based on the anomaly detection performed on the aggregate data). When poisoned data is identified an action set may be generated in order to mitigate and/or prevent impacts to downstream consumers that may otherwise consume the poisoned data.

As discussed above, the components of FIG. 1 may perform methods for data curation from data sources that may supply poisoned data. The methods may include identifying poisoned data and/or managing the introduction of the poisoned data into the data pipeline (e.g., implementing actions from action sets). FIG. 3 illustrates methods that may be performed by the components of FIG. 1. In the diagrams discussed below and shown in FIG. 3, any of the operations may be repeated, performed in different orders, and/or performed in parallel with or in a partially overlapping in time manner with other operations.

Turning to FIG. 3, a flow diagram illustrating a method of curating data from data sources in accordance with an embodiment is shown. The method may be performed by a data processing system, and/or another device.

At operation 302, an identification that the data includes poisoned data is made. The identification may be made by performing an anomaly detection process using a statistical characterization of the data and an anomaly threshold. The anomaly detection process may include (i) obtaining aggregate data (e.g., to obtain an aggregate data summary) based on the data, (ii) obtaining a statistical characterization of the data (e.g., using information from the aggregate data summary), and/or (iii) evaluating the statistical characterization using the anomaly threshold. The statistical characterization may indicate the degree of anomalousness of the data; therefore, the statistical characterization may be evaluated using the anomaly threshold, and the evaluation may indicate whether the data includes poisoned data. For example, if a statistical characterization of a portion of data exceeds the anomaly threshold, the portion of data may include poisoned data.

Anomaly detection may be performed by an independent entity (e.g., a third party), thus, aggregate data summaries and/or statistical characterizations may be provided to the independent entity for further analysis and/or anomaly detection. When anomalous data is detected, a notification (e.g., including information regarding the anomalous data) may be obtained from the independent entity. For more information regarding data aggregation and anomaly detection, refer to the discussion of FIG. 2.

At operation 304, based on the identification made at operation 302, an optimization process may be performed to identify the poisoned data. The optimization process may be performed by ingesting the data into an optimization algorithm. The optimization process may be a global optimization process, and the optimization algorithm (e.g., global optimization algorithm) may be a genetic algorithm and/or may attempt to solve an optimization problem (e.g., identify the smallest portion of data that includes all of the poisoned data) constrained by variables of an objective function. For example, the objective function may be a loss function and therefore, to identify the poisoned data, the optimization algorithm may attempt to find solutions to the optimization problem that minimize the residual of the objective function.

The optimization algorithm may generate iterations of candidate solutions (e.g., sets of test proposals) that indicate different delineations between potentially poisoned data and potentially unpoisoned data. Each subsequent iteration of candidate solutions may be generated based on the best candidates (e.g., test proposals) from the previous iteration.

Each test proposal of the set of test proposals (e.g., generated by each iteration) may be evaluated based on a degree of anomalousness of the different portions of the data (e.g., defined by the delineations of each test proposal). The anomalousness may be based on a statistical characterization of a portion of the data (e.g., of an aggregate data summary of the portion of the data). The degree of anomalousness may be determined by comparing the statistical characterization to one or more anomaly thresholds (e.g., including the anomaly threshold used for anomaly detection in operation 302).

The test proposals may be evaluated using an objective function and/or may be assigned fitness values accordingly. For example, the objective function may penalize each test proposal (e.g., the fitness value of each test proposal) proportionally to a ratio of the size of the poisoned portion to the size of the unpoisoned portion. In other words, a test proposal indicating a smaller poisoned portion of data and a less anomalous unpoisoned portion may be assigned a more satisfactory fitness value when compared other test proposals having larger poisoned portions and more anomalous unpoisoned portions. The objective function may weight its constraint variables (e.g., anomalousness and/or size) differently depending on anomaly detection goals.

Once evaluated, each test proposal may be ranked (e.g., ordered by rank) based on its assigned fitness value. For example, the most satisfactory fitness value (e.g., smallest) may be the highest-ranked test proposal. One or more highest-ranked test proposals may be selected to generate the subsequent iteration of test proposals; however, if the global optimization process has terminated (e.g., a maximum number of iterations and/or a predetermined fitness value threshold has been reached), a final test proposal may be selected as the optimized solution of the global optimization process.

For example, the final test proposal may be the highest-ranked test proposal of the last iteration of the optimization algorithm. The final test proposal of the global optimization process may indicate a delineation between an identified poisoned portion of the data and the remainder of the data (e.g., the unpoisoned portion).

Once identified, the poisoned portion of data may be flagged in order to manage the impact of the poisoned portion of data. The flagged data may be used to generate an action set that may be implemented to mitigate the effects of the poisoned data on consumers of the data (e.g., downstream consumers). Refer to the discussion of FIG. 2 for more details regarding the identification and/or remediation of poisoned data.

At operation 306, performance of an action set may be initiated. Performance of the action set may be initiated by obtaining the action set. The action set may be obtained by (i) reading the action set from storage, (ii) receiving the action set from another device, and/or (iii) generating the action set (e.g., based on the identified poisoned data from operation 304). One or more actions from the action set may be performed, and performance of the action(s) may be based on information regarding the poisoned data (e.g., flagged data), such as the severity of the risk associated with the data, the data source(s) from which the poisoned data was obtained, etc., The action(s), when performed, may reduce and/or prevent an impact (e.g., a negative impact to computer-implemented services) of the identified poisoned data.

The method may end following operation 306.

Using the method illustrated in FIG. 3, a system in accordance with embodiments disclosed herein may be placed in condition to (i) identify poisoned data collected from data sources during data curation (e.g., by performing anomaly detection on aggregate data), (ii) prevent and/or mitigate the impact of the poisoned portions of the curated data by generating and/or implementing remedial action sets, and/or (iii) reduce the likelihood of poisoned data being provided to downstream consumers (e.g., through proactive identification), thereby avoiding interruptions and/or reductions in the quality of the computer-implemented services that may rely on the curated data.

Figure 4:
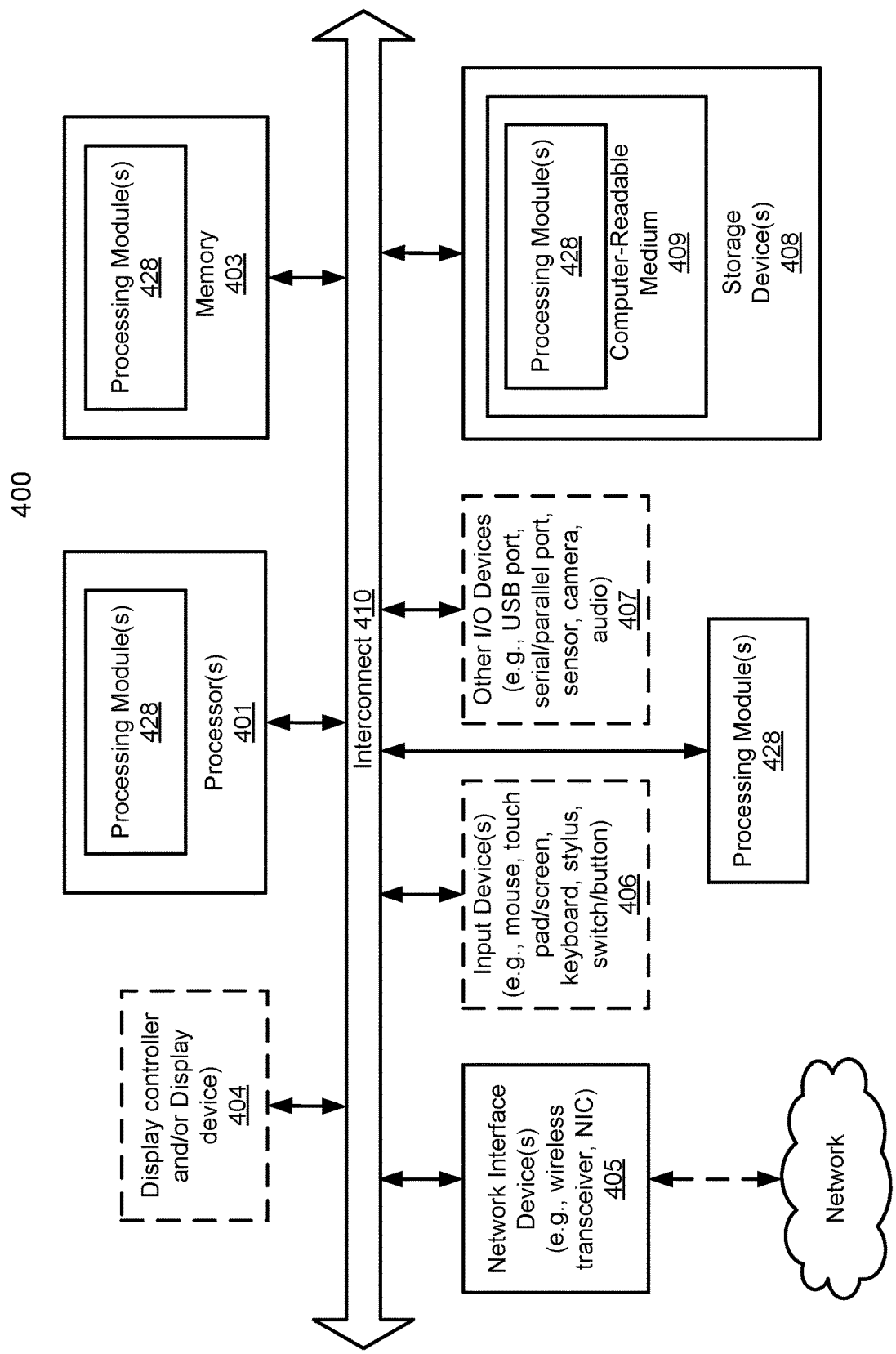
FIG. 4 shows a block diagram illustrating a data processing system in accordance with an embodiment.

Any of the components illustrated and/or described with respect to FIGS. 1-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such, details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for curating data for a user from data sources prior to addition to a data repository, comprising:
    making an identification, using an anomaly detection process, that the data curated for the user is anomalous data; and
    based on the identification that the data is anomalous data:
        performing an optimization process using the data to pinpoint a poisoned portion within the anomalous data, wherein during the optimization process, test proposals that delineate the anomalous data into delineations comprising and recognized as a potentially poisoned portion of the anomalous data and potentially unpoisoned portion of the anomalous data are generated where all of the delineations of all of the test proposals that are generated are evaluated during the optimization process to pinpoint the poisoned portion within the anomalous data, and the optimization process being different from the anomaly detection process, and
        initiating performance of an action set, based on the poisoned portion pinpointed during the optimization process, to manage an impact of the anomalous data, the action set comprising:
            separating the poisoned portion from the anomalous data to obtain an unpoisoned portion of the anomalous data and providing only the unpoisoned portion to the user, and
            identifying at least one data source among the data sources from which the poisoned portion was obtained and using information regarding the at least one data source in subsequent ones of the anomaly detection process.

2. The method of claim 1, wherein making the identification comprises performing a first anomaly detection process using a first statistical characterization of the data and an anomaly threshold, the data being aggregate data and the first statistical characterization being based on a first aggregate data summary for the aggregate data.

3. The method of claim 2, wherein the first statistical characterization indicates a degree of anomalousness of the aggregate data.

4. The method of claim 2, wherein, for each test proposal of the test proposals, the anomalous data is delineated into only one each of the potentially poisoned portion and the potentially unpoisoned portion where the potentially poisoned portion is a first portion of the anomalous data and the potentially unpoisoned portion is a second portion of the anomalous data for each of the test proposals.

5. The method of claim 4, wherein performing the optimization process comprises:
    iteratively generating sets of the test proposals, each subsequent set of the sets being generated based on a selection of the test proposals from a previous set, the selection being based on a rank ordering of the test proposals of the previous set.

6. The method of claim 5, wherein the rank ordering is based on a fitness value for each test proposal of the previous set.

7. The method of claim 6, wherein the rank ordering is obtained by:
    for each test proposal of the test proposals:
        obtaining a second statistical characterization of the second portion and a size of the first portion, the second statistical characterization being based on a second aggregate data summary of the first portion, and the second statistical characterization indicating a degree of anomalousness of the second portion,
        obtaining the fitness value based on the second statistical characterization, the size, and the anomaly threshold, and
        obtaining a rank for the test proposal based on the fitness value, the rank being usable to order the test proposals using the rank ordering.

8. The method of claim 7, wherein pinpointing the poisoned portion within the anomalous data comprises selecting a final test proposal of the test proposals based on the rank ordering of the test proposals, the final test proposal being an optimized solution of the optimization process.

9. The method of claim 8, wherein an objective function, used to obtain the fitness value, penalizes each test proposal proportionally to a ratio of the size of the first portion to the size of the second portion.

10. The method of claim 9, wherein the optimization process is implemented using a genetic algorithm.

11. A non-transitory machine-readable medium having instructions stored therein, which when executed by a processor, cause the processor to perform operations for curating data for a user from data sources prior to addition to a data repository, the operations comprising:
    making an identification, using an anomaly detection process, that the data curated for the user is anomalous data; and
    based on the identification that the data is anomalous data:
        performing an optimization process using the data to pinpoint a poisoned portion within the anomalous data, wherein during the optimization process, test proposals that delineate the anomalous data into delineations comprising and recognized as potentially poisoned portion of the anomalous data and potentially unpoisoned portion of the anomalous data are generated where all of the delineations of all of the test proposals that are generated are evaluated during the optimization process to pinpoint the poisoned portion within the anomalous data, and the optimization process being different from the anomaly detection process, and
        initiating performance of an action set, based on the poisoned portion pinpointed during the optimization process, to manage an impact of the anomalous data, the action set comprising:
            separating the poisoned portion from the anomalous data to obtain an unpoisoned portion of the anomalous data and providing only the unpoisoned portion to the user, and
            identifying at least one data source among the data sources from which the poisoned portion was obtained and using information regarding the at least one data source in subsequent ones of the anomaly detection process.

12. The non-transitory machine-readable medium of claim 11, wherein making the identification comprises performing a first anomaly detection process using a first statistical characterization of the data and an anomaly threshold, the data being aggregate data and the first statistical characterization being based on a first aggregate data summary for the aggregate data.

13. The non-transitory machine-readable medium of claim 12, wherein the first statistical characterization indicates a degree of anomalousness of the aggregate data.

14. The non-transitory machine-readable medium of claim 11, wherein, for each test proposal of the test proposals, the anomalous data is delineated into only one each of the potentially poisoned portion and the potentially unpoisoned portion where the potentially poisoned portion is a first portion of the anomalous data and the potentially unpoisoned portion is a second portion of the anomalous data for each of the test proposals.

15. The non-transitory machine-readable medium of claim 14, wherein performing the optimization process comprises:
iteratively generating sets of the test proposals, each subsequent set of the sets being generated based on a selection of the test proposals from a previous set, the selection being based on a rank ordering of the test proposals of the previous set.

16. A data processing system, comprising:
a processor; and
a memory coupled to the processor to store instructions, which when executed by the processor, cause the processor to perform operations for curating data for a user from data sources prior to addition to a data repository, the operations comprising:
making an identification, using an anomaly detection process, that the data-curated for the user is anomalous data; and
based on the identification that the data is anomalous data:
performing an optimization process using the data to pinpoint a poisoned portion within the anomalous data, wherein during the optimization process, test proposals that delineate the anomalous data into delineations comprising and recognized as potentially poisoned portion of the anomalous data and potentially unpoisoned portion of the anomalous data are generated where all of the delineations of all of the test proposals that are generated are evaluated during the optimization process to pinpoint the poisoned portion within the anomalous data, and the optimization process being different from the anomaly detection process, and
initiating performance of an action set, based on the poisoned portion pinpointed during the optimization process, to manage an impact of the anomalous data, the action set comprising:
separating the poisoned portion from the anomalous data to obtain an unpoisoned portion of the anomalous data and providing only the unpoisoned portion to the user, and
identifying at least one data source among the data sources from which the poisoned portion was obtained and using information regarding the at least one data source in subsequent ones of the anomaly detection process.

17. The data processing system of claim 16, wherein making the identification comprises performing a first anomaly detection process using a first statistical characterization of the data and an anomaly threshold, the data being aggregate data and the first statistical characterization being based on a first aggregate data summary for the aggregate data.

18. The data processing system of claim 17, wherein the first statistical characterization indicates a degree of anomalousness of the aggregate data.

19. The data processing system of claim 16, wherein, for each test proposal of the test proposals, the anomalous data is delineated into only one each of the potentially poisoned portion and the potentially unpoisoned portion where the potentially poisoned portion is a first portion of the anomalous data and the potentially unpoisoned portion is a second portion of the anomalous data for each of the test proposals.

20. The method of claim 1, wherein, for each of the test proposals, the potentially poisoned portion of the anomalous data is evaluated based at least on a size characteristic of the potentially poisoned portion and the potentially unpoisoned portion of the anomalous data is evaluated at least by comparing a statistical characterization of the potentially unpoisoned portion to an anomaly threshold used during the anomaly detection process, the statistical characterization of the potentially unpoisoned portion describes an anomalousness of the potentially unpoisoned portion.

* * * * *